No. 802,210. PATENTED OCT. 17, 1905.
F. H. HEISE.
SHAFT LINING RING AND TUBBING.
APPLICATION FILED DEC. 19, 1904.

WITNESSES

INVENTOR
Fritz Hermann Heise.

UNITED STATES PATENT OFFICE.

FRITZ HERMANN HEISE, OF BOCHUM, GERMANY.

SHAFT-LINING RING AND TUBBING.

No. 802,210.　　　　　Specification of Letters Patent.　　　　　Patented Oct. 17, 1905.

Application filed December 19, 1904. Serial No. 237,410.

*To all whom it may concern:*

Be it known that I, FRITZ HERMANN HEISE, professor and director of the Royal Mining School in Bochum, a subject of the King of Prussia, German Emperor, residing at 45 Hernerstrasse, in the city of Bochum, Kingdom of Prussia, German Empire, have invented certain new and useful Improvements in Shaft-Lining Rings or Tubbings, of which the following is a full, clear, and exact description, reference being had to the accompanying drawings, forming part of this specification, in which—

Figure 1:
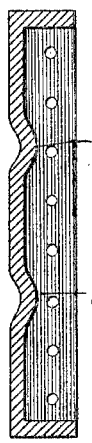
Figure 2:
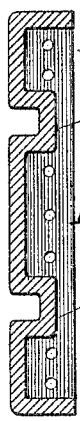
Figure 3:
Figure 4:
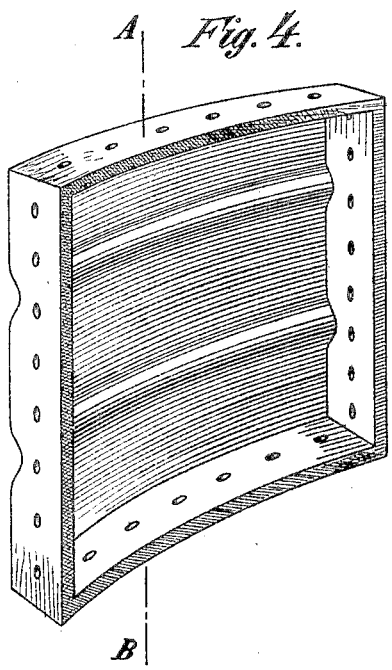

Figure 1 is a vertical section on the line A B of Fig. 4, showing a segment of a shaft-lining embodying my invention. Figs. 2 and 3 are similar views of modified forms, and Fig. 4 is a perspective view of the segment shown in Fig. 1.

In the boring of shafts or wells by the Kind-Chaudron process cast-iron shaft-linings with cylindrical smooth outer surfaces are used for lining the joints of the shaft. Also in sinking shafts by manual labor and through water-bearing rock cast-iron tubbings with smooth outer surfaces are used. These shaft-linings consist of segmental sections, which are connected within the shaft by screws or bolts, so as to constitute rings. As the shaft rings and tubbings may each have a height of one and one-half meters, they should be provided with horizontal strengthening-ribs. In my construction the ribs are made integral with the cast-iron wall, so as to constitute a series of encircling rings or ribs, which strengthen these walls and enable them to resist the external pressure of the surrounding water and rock. The greater the pressure which is to be resisted the greater must be the thickness of the shaft-walls. However, a certain thickness of the walls cannot be exceeded on account of the strain during the process of casting. This limit is about one hundred and ten millimeters in case only horizontal strengthening-ribs are employed. If one is compelled to provide also vertical strengthening-ribs, the maximum practicable thickness of wall is reached at ninety millimeters, because the strain during the casting becomes too large at the points of intersection of the ribs. The restriction of the thickness of the wall is also conditioned upon the depth and diameter of the shaft. With a shaft of five meters diameter the lining with shaft rings or tubbings cannot be employed at a greater depth than about three hundred meters and with a shaft of four meters diameter at a depth greater than about four hundred meters.

Heretofore for the lining of vertical shafts only smooth cast-iron shaft rings or tubbings were used, which were provided on the inside or on the outside with ribs and flanges. It was never attempted and has never been suggested to give these shaft-rings and shaft-tubbings an undulating form. It was thought that in shafts the water and earth pressure was equally distributed around the shaft-linings, so that these were only subjected to compressing and not to bending stresses. If, however, the resistance to compression is the main point, the sectional form is immaterial, whereas the sectional surface is of importance. Therefore the plain smooth walls were employed, the advantages of the corrugated form not being recognized. For tunnels and galleries in mines it was a different matter, because here the pressure is always more or less unequal. Therefore one occasionally finds in tunnels and galleries corrugated sheets and corrugated iron-plates used, the same as are frequently used for other building purposes. While increasing the depth of the shafts certain difficulties arose, which do not exist in tunnels and galleries. The shaft-lining must withstand the entire water-pressure, which for three hundred meters depth amounts to thirty atmospheres and for four hundred meters depth to forty atmospheres. In shafts having a large diameter of from four to five meters and more the pressure to be resisted is very great. In consideration of these compression strains the shaft-linings must have a wall thickness of from one hundred to one hundred and fifty millimeters or more. Such strong cast-iron walls will not, owing to the internal strains during the process of casting, allow of being cast. In this case the corrugated shape helps to overcome this difficulty by disposing a comparatively great amount of material per centimeter or per meter depth of the shaft, even in the case of quite a thin wall. In tunnels and galleries neither the necessity mentioned nor the difficulties exist, as they usually extend horizontally through the mountain and have no water-pressure to withstand. In tunnels which are operated under river-beds there are only small water-pressures of perhaps ten to thirty meters, so that by the small thickness of wall necessary the casting strain is of no importance. Particular strains which also do not exist in tunnels and galleries are found in the so-called "sinking-shafts." In these a cast-iron lining is pressed down or sinks down, corresponding to the gradually-increasing depth of the shaft. The gradually pressed-down or sinking lining, which is in motion with respect to the earth, meets with unequal resistance on the circumference of the shaft. Empty spaces are often formed back of the lining until the earth falls in again. A sinking-shaft is therefore subject to very great thrusts and bending strains and often collapses. By the use of corrugated shaft-rings and shaft-tubbings (the outside undulations being filled with concrete) it is possible to increase the resistance of the sinking-shaft to an extent which was heretofore unknown. Again, my corrugated linings are of great value where the shaft-lining is first built up and then sunk into a shaft filled with water and which has been bored according to the well-known Kind-Chaudron method. In shafts, therefore, difficulties are encountered which are not found in tunnels. The discovery of the usefulness of corrugated shaft rings and tubbings for shafts and the discovery of the certain advantages derived from the use of the same is new.

According to the present invention it is intended to dispense entirely with the horizontal strengthening-ribs in order to decrease the strain incident to the casting operation. Instead of being strengthened against the effects of lateral pressure by ribs the segments of the linings or tubbings are recessed inwardly in planes transverse to the shaft, as shown at *a* in Figs. 1 to 3, the recessed portions forming annular corrugations in the lining. A shaft-ring or well-ring composed of segments constructed in this manner permits of being cast considerably stronger than the constructions previously described, since in dispensing with vertical ribs the point of greatest strain in casting the former segment—viz., the intersection of vertical and horizontal ribs—is entirely eliminated. Furthermore, a shaft-ring composed of my improved segments will be capable of considerably greater resistance to outside pressure, because the undulatory constrictions may be repeated, so as to be as near to each other as desired without increasing the strain incident to casting. This results in the construction of a corrugated tube of segments (shown in section in Fig. 3) the resisting capacity of which against outside pressure is at least one and one-half times as large as that of a smooth tube when the strength of the wall remains the same. The weight of the corrugated shaft-ring will therefore become less than with the old construction on the basis of equal resisting capacity.

The combination with vertical strengthening-ribs of any suitable kind is not excluded with the new rings composed of segments herein described. In the corrugated tubbings, however, these strengthening-ribs will hardly be necessary, inasmuch as the vertical joint-flanges will constitute a sufficient strengthening in the vertical direction.

What I claim, and desire to secure by Letters Patent of the United States, is—

1. A shaft-lining or shaft-tubbing, comprising segmental cast-iron sections corrugated on their inner and outer surfaces, without intersecting ribs, and peripheral walls constituting vertical and horizontal joint-flanges; substantially as described.

2. A cast-iron segment for a shaft-lining or shaft-tubbing having parallel corrugations without intersecting ribs, and rectangular side walls constituting joint-flanges for the lining; substantially as described.

In witness whereof I have hereunto signed my name in the presence of two subscribing witnesses.

FRITZ HERMANN HEISE.

Witnesses:
ERNEST BRODIE,
PETER LIEBER.